United States Patent
Hong et al.

(10) Patent No.: US 11,607,048 B2
(45) Date of Patent: Mar. 21, 2023

(54) SEATBACK POCKET

(71) Applicants: HYUNDAI MOTOR COMPANY, Seoul (KR); KIA CORPORATION, Seoul (KR); ADIENT KOREA, INC., Asan-si (KR)

(72) Inventors: Suk Won Hong, Bucheon-si (KR); Sang Man Seo, Suwon-si (KR); Jong Seok Han, Suwon-si (KR); Sung Hak Hong, Suwon-si (KR); Young Bae Kim, Suwon-si (KR); Jae Heon Lee, Ansan-si (KR); Jong Ho Kim, Bucheon-si (KR)

(73) Assignees: HYUNDAI MOTOR COMPANY, Seoul (KR); KIA CORPORATION, Seoul (KR); ADIENT KOREA, INC., Asan-si (KR)

( * ) Notice: Subject to any disclaimer, the term of this patent is extended or adjusted under 35 U.S.C. 154(b) by 0 days.

(21) Appl. No.: 17/473,978

(22) Filed: Sep. 13, 2021

(65) Prior Publication Data

US 2022/0095799 A1    Mar. 31, 2022

(30) Foreign Application Priority Data

Sep. 29, 2020  (KR) .................. 10-2020-0126922

(51) Int. Cl.
*A47C 7/62* (2006.01)
*B60R 7/00* (2006.01)

(52) U.S. Cl.
CPC .............. *A47C 7/622* (2018.08); *B60R 7/005* (2013.01)

(58) Field of Classification Search
CPC .............. B60R 7/005; B60R 7/00; B60N 2/64
See application file for complete search history.

(56) References Cited

U.S. PATENT DOCUMENTS

| 1,527,056 A  * | 2/1925 | Martin .................... B60R 7/043 224/572 |
| 8,152,234 B2 * | 4/2012 | Terleski ................. B64D 11/06 297/188.04 |
| 9,573,528 B1 * | 2/2017 | Line ........................ B60R 7/005 |
| 10,246,021 B2 * | 4/2019 | Lemarchand ........... B60R 7/081 |
| 10,246,022 B2 * | 4/2019 | Perrin ...................... B60N 2/90 |

(Continued)

FOREIGN PATENT DOCUMENTS

| JP | 1988-0202542 U | 12/1988 |
| JP | H09-123814 A | 5/1997 |

(Continued)

*Primary Examiner* — Shin H Kim
(74) *Attorney, Agent, or Firm* — McDonnell Boehnen Hulbert & Berghoff LLP

(57) ABSTRACT

In the present disclosure, a seatback pocket is introduced, which includes a backboard combined with a rear side of a seatback and including a hinge shaft provided at a lower end in left and right width directions; a pocket member having a hinge part formed at a lower end and combined with the hinge shaft through a hinge structure to be rotated based on the hinge shaft to provide a pocket space in a region facing the backboard; and an elastic member connected between both ends of the pocket member and the backboard in a shape blocking sides of the pocket space, and configured to provide an elastic restoring force with respect to a rotation direction of the pocket member.

9 Claims, 7 Drawing Sheets

(56) References Cited

U.S. PATENT DOCUMENTS

| | | | |
|---|---|---|---|
| 10,377,315 B2 * | 8/2019 | Hellman | B60Q 3/225 |
| 10,414,343 B2 * | 9/2019 | Shrewsbury | B60R 7/043 |
| 2007/0235483 A1 * | 10/2007 | Konet | B60R 7/043 |
| | | | 224/282 |
| 2018/0134224 A1 * | 5/2018 | Perrin | B60R 7/005 |
| 2018/0201196 A1 * | 7/2018 | Hellman | B60R 7/005 |
| 2019/0210535 A1 * | 7/2019 | Shrewsbury | B60R 7/043 |
| 2022/0095799 A1 * | 3/2022 | Hong | A47C 7/622 |

FOREIGN PATENT DOCUMENTS

| | | |
|---|---|---|
| JP | 2013-6459 A | 1/2013 |
| KR | 2016-0020603 A | 2/2016 |

* cited by examiner

SEATBACK POCKET

CROSS REFERENCE TO RELATED APPLICATIONS

The present application claims priority of Korean Patent Application No. 10-2020-0126922 filed on Sep. 29, 2020, the entire contents of which is incorporated herein for all purposes by this reference.

BACKGROUND

Field

The present disclosure relates to a seatback pocket which reduces the cost and weight of a product through decrease of the number of parts by making an assembly structure of a seatback pocket compact.

Description of the Related Art

A pocket capable of easily storing a book, a document, or a small item is usually located on each seatback of all seats of a vehicle.

Such a pocket is classified in accordance with a vehicle segment, and a pocket type is determined accordingly.

As one pocket type, in case of a seatback pocket including an injection type covering, it has a relatively high level of quality, having high strength, stiffness, and durability.

A seatback pocket in the related art will be briefly described. A backboard is combined with the rear side of the seatback, and a backboard covering is combined with the rear side of the backboard.

Further, a pocket covering is combined with an outside of a sub-pocket panel to be exposed to an outside, and a main pocket panel is combined with the inside of the sub-pocket panel to configure a pocket panel part.

Further, the lower end of the backboard covering is combined with a lower end of the pocket panel part using fixing stick, and a return spring is provided to provide a rotational resilience with respect to a rotation direction of the pocket panel part, so that the seatback pocket is configured.

However, in case of the seatback pocket in the related art as described above, since the number of parts being used to assemble the seatback pocket is excessive, there is a drawback that the cost and the weight of the seatback pocket are increased and workmanship is increased.

The foregoing description of the background technology is intended merely to help the understanding of the background of the present disclosure, and is not intended to mean that the present disclosure falls within the purview of the related art that is already known to those of ordinary skill in the art.

SUMMARY

The present disclosure is proposed to solve the above-mentioned problems, and an object of the present disclosure is to provide a seatback pocket which can reduce the cost and the weight of a product through decrease of the number of parts by making an assembly structure of a seatback pocket compact.

In order to achieve the above object, a seatback pocket according to the present disclosure may include a backboard secured to a rear side of a seatback and including a hinge shaft provided at a lower end extending in a horizontal direction, a pocket member having a hinge part formed at a lower end and secured to the hinge shaft through a hinge structure to be rotated based on the hinge shaft, and formed in a shape covering an outside of the backboard to provide a pocket space in a region facing the backboard, and an elastic member connected between both ends of the pocket member and the backboard in a shape blocking sides of the pocket space, and being configured to provide an elastic restoring force with respect to a rotation direction of the pocket member of which the pocket space is expanded.

A hinge insertion hole may be formed at a lower end of the backboard, the hinge shaft may be separately provided in front of the hinge insertion hole, one end of the hinge part may be fixed to a rear side of a lower end of the pocket member and may be inserted into the hinge insertion hole, and a hinge fitting groove corresponding to a cross-sectional shape of the hinge shaft may be formed at the other end of the hinge part in left and right width directions and the hinge shaft may be fitted into the hinge fitting groove.

The hinge part may have an L-shaped cross section and the hinge fitting groove may be formed to be directed or facing downward, and a fitting slot having a length shorter than an inner diameter of the hinge fitting groove may be formed to be open in a radial direction of the hinge fitting groove being directed to the hinge shaft and the hinge shaft may be fitted into the fitting slot.

One end of the elastic member may be connected to a side part of the pocket member, a through-slot may be formed on a side part of the backboard and the elastic member may penetrate the through-slot, and the other end of the elastic member may be secured to a front side of the backboard.

A connection ring may be formed on a side part of a front side of the pocket member and the elastic member may be hook-combined with the connection ring.

Connection rings may be formed on both side parts of a rear side of the pocket member and the elastic member may be penetratingly hooked to both side connection rings.

The connection ring may be formed in a shape corresponding to the through-slot, and the connection ring may be inserted into the through-slot.

The elastic member may include a fabric part formed in a surface shape having a predetermined area and having one end combined with the pocket member, and an elastic band formed of a material having elasticity and having one end secured to the other end of the fabric part and the other end secured to the backboard.

A hooking hole may be formed at the other end of the elastic member, and a hook may be formed on a middle portion of a rear side of the backboard and the hooking hole may be hook-combined with the hook.

The elastic member may include a fabric part formed in a surface shape having a predetermined area and having a middle portion being penetratingly hooked on both sides of the pocket member, and an elastic band secured to both ends of the fabric part, formed of a material having elasticity, and having one end secured to one end of the fabric part and the other end secured to the backboard.

According to the present disclosure, through the above-described problem solving means, since the seatback pocket is implemented only by three parts of the backboard, the pocket member, and the elastic member, the number of parts being used to manufacture a pocket can be drastically reduced, and thus the cost and weight of the seatback pocket can be decreased in accordance with the reduction of the number of parts.

In addition, since the exterior of the seatback pocket is finished through injection molding of the backboard and the pocket member, the quality level of the seatback pocket product can be improved with the price competitiveness thereof maintained, and thus the productivity can be improved through upgrading of the product.

BRIEF DESCRIPTION OF THE FIGURES

The above and other objects, features and advantages of the present disclosure will be more clearly understood from the following detailed description taken in conjunction with the accompanying drawings, in which.

DETAILED DESCRIPTION

Hereinafter, preferred embodiments of the present disclosure will be described in detail with reference to the accompanying drawings.

Figure 1:
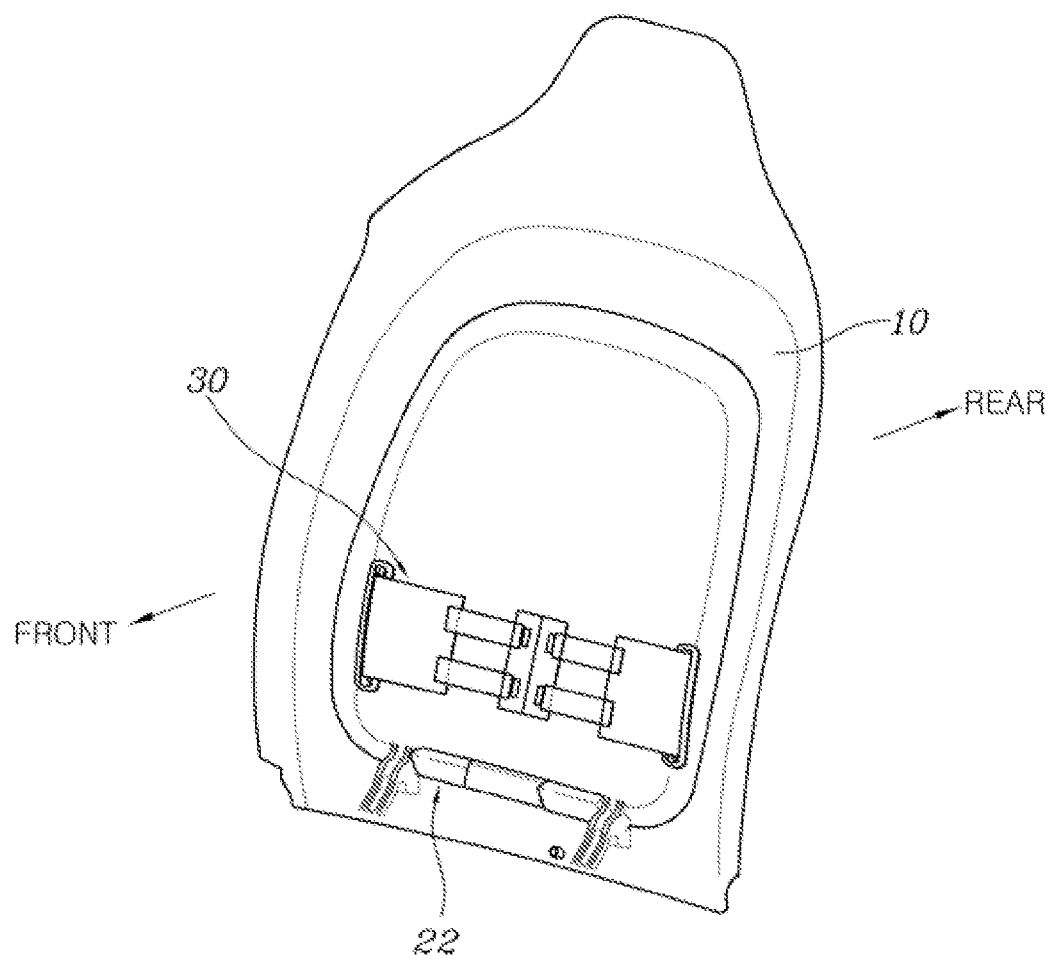
FIG. 1 is a view illustrating the front shape of a backboard assembled with a pocket member and an elastic member according to the present disclosure.
Figure 2:
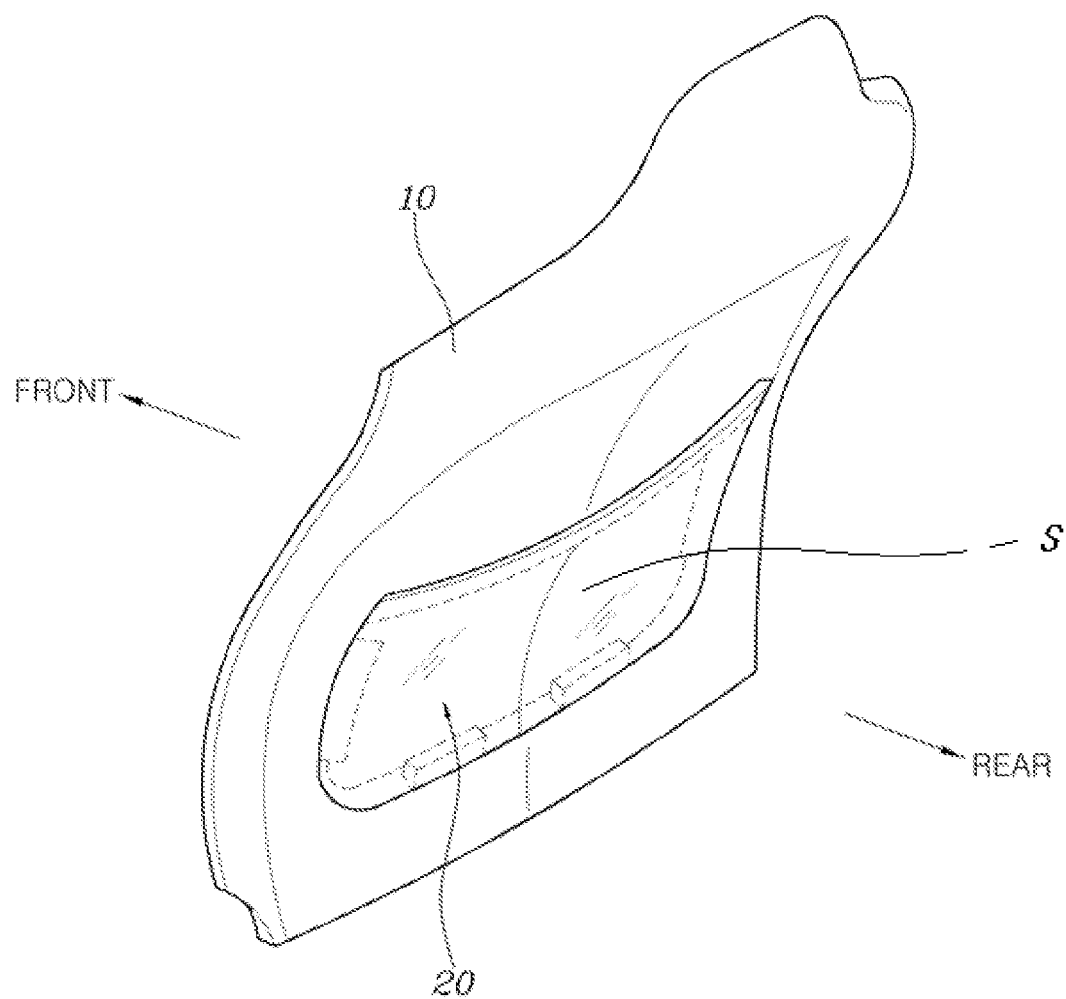
FIG. 2 is a view illustrating the rear shape of the backboard illustrated in FIG. 1.
Figure 3:
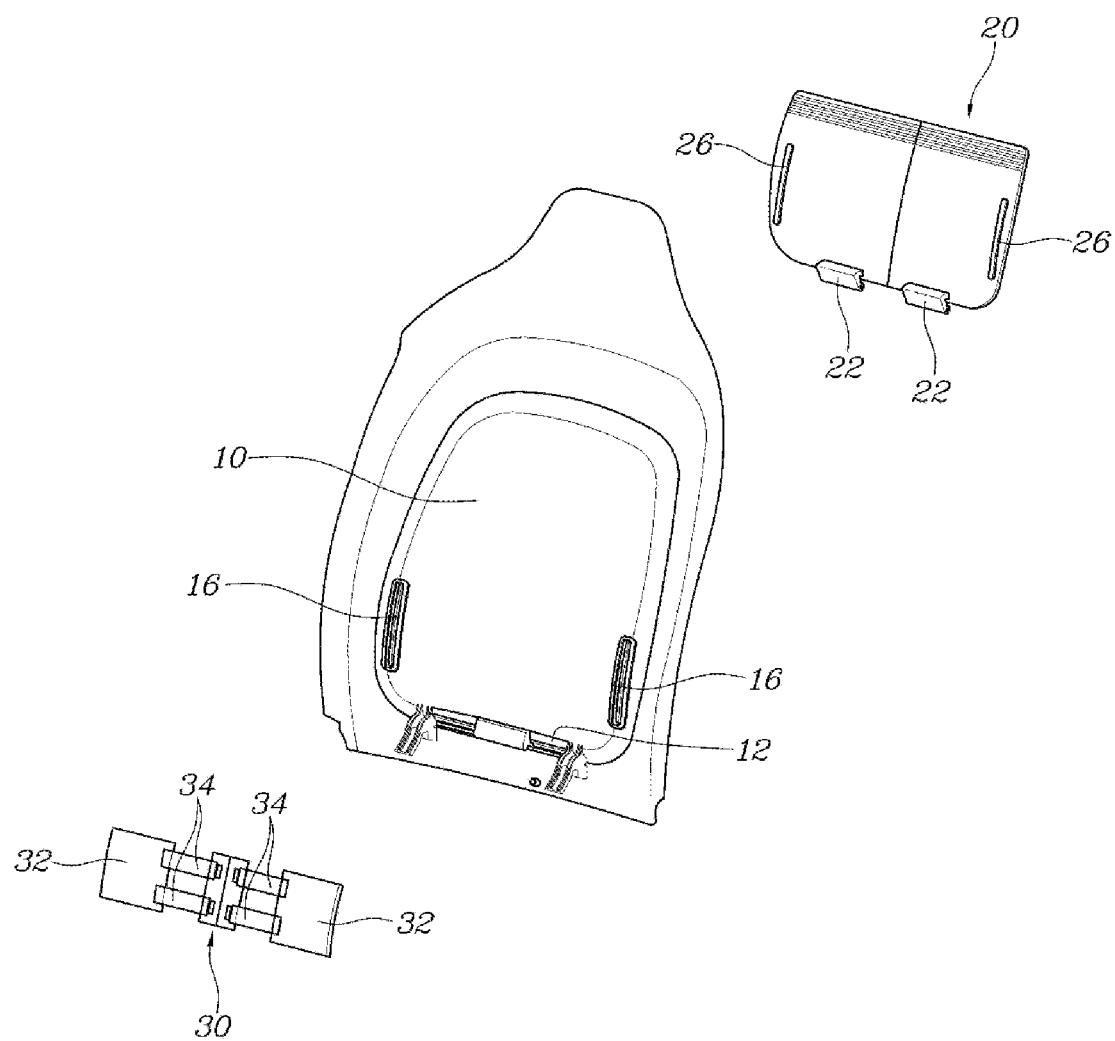
FIG. 3 is an exploded perspective view of parts for assembling a seatback pocket according to the present disclosure.

FIG. 1 is a view illustrating the front shape of a backboard 10 assembled with a pocket member 20 and an elastic member 30 according to the present disclosure, FIG. 2 is a view illustrating the rear shape of the backboard 10 illustrated in FIG. 1, and FIG. 3 is an exploded perspective view of parts for assembling a seatback pocket according to the present disclosure.

A seatback pocket according to the present disclosure is briefly composed of a backboard 10, a pocket member 20, and an elastic member 30.

Referring to FIGS. 1 to 3, the seatback pocket according to the present disclosure is configured to include a backboard 10 combined with a rear side of a seatback and including a hinge shaft 14 (FIG. 4) provided at a lower end in left and right width directions, a pocket member 20 having a hinge part 22 formed at a lower end and combined with the hinge shaft 14 through a hinge structure to be rotated based on the hinge shaft 14, and formed in a shape covering an outside of the backboard 10 to provide a pocket space S in a region facing the backboard 10, and an elastic member 30 connected between both ends of the pocket member 20 and the backboard 10 in a shape blocking sides of the pocket space S, and configured to provide an elastic restoring force with respect to a rotation direction of the pocket member 20 of which the pocket space S is expanded.

For example, the backboard 10 is formed in a shape surrounding and covering the rear side of the seatback, and the front side of the backboard 10 is combined with the rear side of the seatback.

Further, the pocket member 20 is formed in a rectangular panel shape, and covers a part of a lower end portion of the rear side of the backboard 10.

That is, since the hinge shaft 14 is provided on the backboard 10 itself and the hinge part 22 combined with the hinge shaft 14 is formed on the pocket member 20, the hinge combination structure is implemented by the backboard 10 and the pocket member 20 only.

Further, the elastic member 30, which provides an elastic restoring force to the pocket member 20 and blocks both sides of the pocket space S, is directly combined with the backboard 10 and the pocket member 20, and thus any part for combining the elastic member 30 is not separately required.

As described above, according to the present disclosure, since the seatback pocket comprises only by three parts of the backboard 10, the pocket member 20, and the elastic member 30, the number of parts being used to manufacture the pocket can be drastically reduced, and thus the cost and the weight of the seatback pocket can be decreased in accordance with the reduction of the number of parts.

In addition, since the exterior of the seatback pocket is finished through injection molding of the backboard 10 and the pocket member 20, the quality level of the seatback pocket product can be improved with the price competitiveness thereof maintained.

Figure 4:
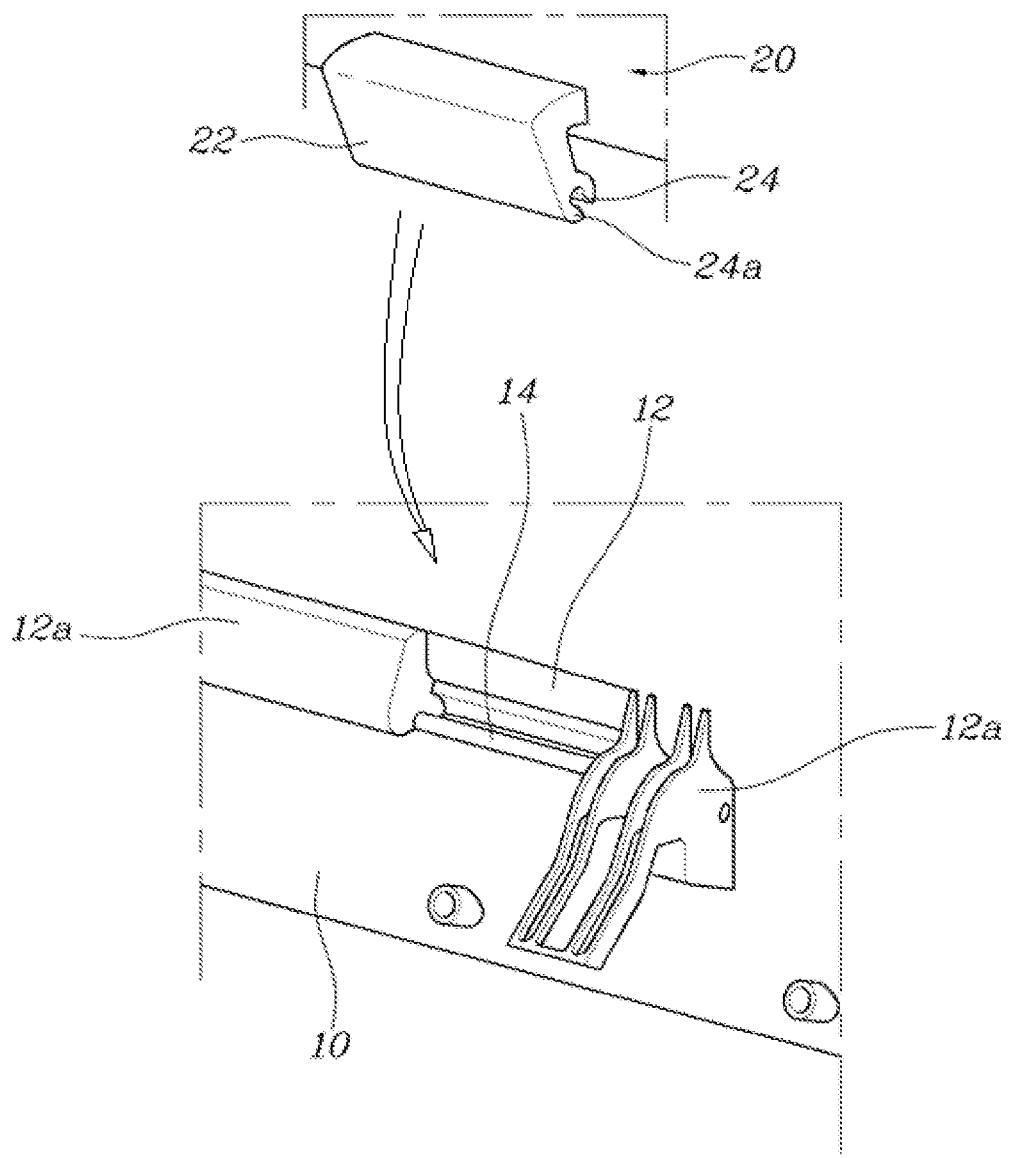
FIG. 4 is an enlarged view illustrating the state of a hinge part before being inserted into a hinge insertion hole according to the present disclosure.
Figure 5:
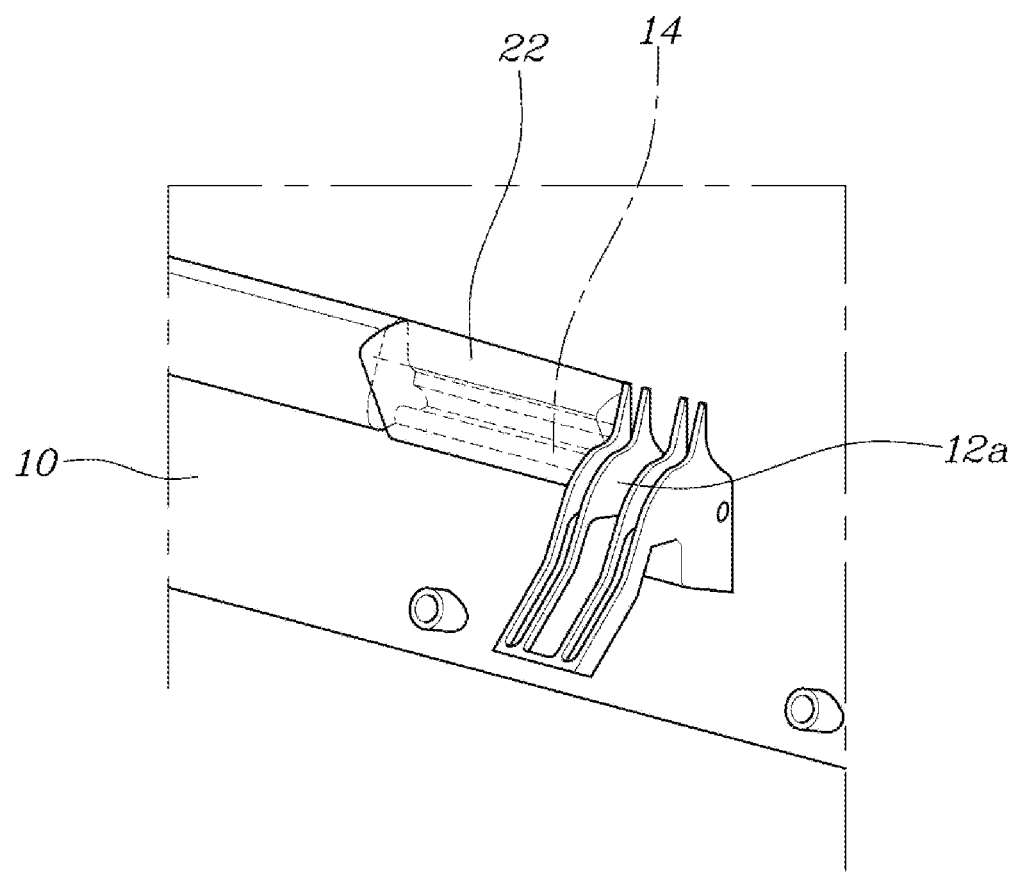
FIG. 5 is a view illustrating a hinge part being in a state where it is inserted into a hinge insertion hole and is fitted into a hinge shaft according to the present disclosure.

In addition, FIG. 4 is an enlarged view illustrating the state of a hinge part 22 before being inserted into a hinge insertion hole 12 according to the present disclosure, and FIG. 5 is a view illustrating a hinge part 22 being in a state where it is inserted into a hinge insertion hole 12 and is fitted into a hinge shaft 14 according to the present disclosure.

Referring to the drawings, the hinge combination structure of the hinge shaft 14 and the hinge part 22 will be described in detail. A hinge insertion hole 12 is formed at a lower end of the backboard 10, the hinge shaft 14 is separately provided in front of the hinge insertion hole 12, one end of the hinge part 22 is fixed to a rear side of a lower end of the pocket member 20 and is inserted into the hinge insertion hole 12, and a hinge fitting groove 24 corresponding to a cross-sectional shape of the hinge shaft 14 is formed at the other end of the hinge part 22 in a horizontal direction and the hinge shaft 14 is fitted into the hinge fitting groove 24 in a hinge structure.

For example, each hinge insertion hole 12 is formed on both sides of the lower end of the backboard 10 in left and right width directions, and the hinge part 22 is formed to project from a position corresponding to the hinge insertion hole 12 on both rear sides of the lower end of the pocket member 20, so that the hinge part 22 is inserted into the hinge insertion hole 12.

Further, on both sides of the hinge insertion hole 12, a hinge fixing part 12a is formed to project toward the front of the backboard 10, and both ends of the hinge shaft 14 are fixed to the hinge fixing part 12a, so that the hinge shaft 14 can be provided in a position spaced apart toward the front of the hinge insertion hole 12.

In addition, the cross section of the hinge shaft 14 is formed in a circular shape, and the cross section of the hinge fitting groove 24 is formed in a circular shape corresponding to the cross-sectional shape of the hinge shaft 14.

Accordingly, in a process in which the hinge part 22 is inserted into the hinge insertion hole 12, the hinge shaft 14 is fitted into the hinge fitting groove 24, and thus the pocket member 20 can be combined with the backboard 10 through a hinge structure.

In addition, the hinge part 22 is formed in a shape of an L-shaped cross section and the hinge fitting groove 24 is formed to be directed downward (facing the downward direction), and a fitting slot 24*a* having a length shorter than an inner diameter of the hinge fitting groove 24 is formed to be open in a radius direction of the hinge fitting groove 24 being directed to the hinge shaft 14 and the hinge shaft 14 is fitted into the fitting slot 24*a*.

In this case, since the middle end of the hinge part 22 is formed to be bent and the hinge fitting groove 24 is positioned to be lower than one end of the hinge part 22, the hinge shaft 14 is also provided in a position corresponding to the hinge fitting groove 24.

Accordingly, in the process in which the hinge part 22 is inserted into the hinge insertion hole 12, the hinge shaft 14 enters into the fitting slot 24*a*, and in this state, the hinge part 22 is pressed toward the hinge shaft 14, so that the hinge shaft 14 passes through the fitting slot 24*a* in a pressing state, and thus the hinge shaft 14 is firmly fitted into the hinge fitting groove 24.

Figure 6:
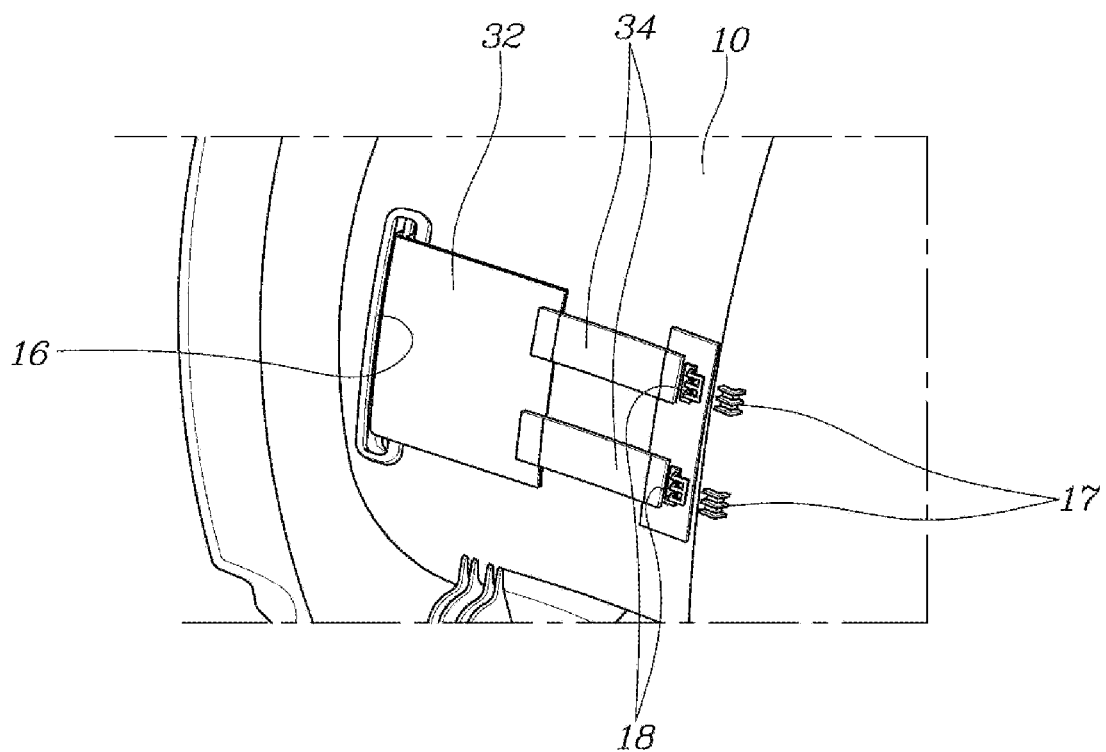
FIG. 6 is an enlarged view illustrating the shape of an elastic member being combined with a connection ring of a pocket member and a hook of a backboard according to the present disclosure.

Meanwhile, FIG. 6 is an enlarged view illustrating the shape of an elastic member 30 being combined with a connection ring 26 of a pocket member 20 and a hook 18 of a backboard 10 according to the present disclosure.

Referring to the drawings, the combination relationship of the elastic member 30 will be described in more detail. One end of the elastic member 30 is connected to a side part of the pocket member 20, a through-slot 16 is formed on a side part of the backboard 10 and the elastic member 30 penetrates the through-slot 16, and the other end of the elastic member 30 is combined with a front side of the backboard 10.

For example, since one end of the elastic member 30 is combined with both front sides of the pocket member 20 and the through-slot 16 is formed on both sides of the backboard 10 facing both sides of the pocket member 20, the elastic member 30 combined with the both sides of the pocket member 20 penetrates the through-slot 16 and is positioned in front of the backboard 10.

Accordingly, the other end of the elastic member 30 is combined with the front side of the backboard 10 to form a structure in which the elastic member 30 is connected between the pocket member 20 and the backboard 10.

Figure 7:
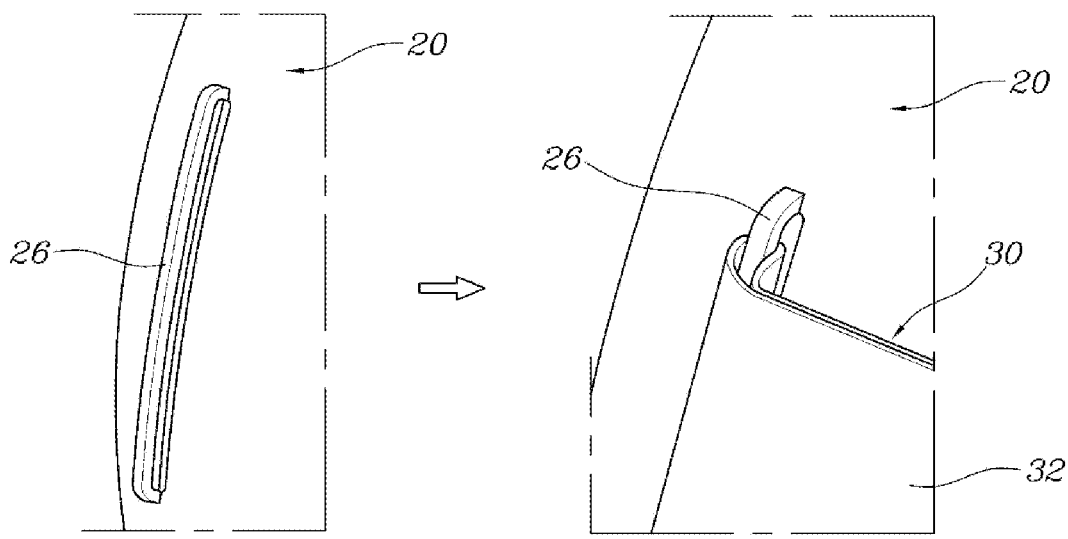
FIG. 7 is a view illustrating the shape of an elastic member being combined with a connection ring according to the present disclosure.

In addition, FIG. 7 is a view illustrating the shape of an elastic member 30 being combined with a connection ring 26 according to the present disclosure. Referring to the drawing, a connection ring 26 is formed on a side part of a front side of the pocket member 20 to form a structure in which the elastic member 30 is hook-combined with the connection ring 26.

For example, the connection ring 26 is formed long in up and down length (vertical) directions, and is formed to project toward the front of the pocket member 20.

Further, the elastic member 30 is formed to have a length corresponding to the up and down length directions of the connection ring 26, and is penetratingly combined with the connection ring 26.

In addition, according to the present disclosure, connection rings 26 are formed on both side parts of the rear side of the pocket member 20, and elastic members 30 are penetratingly hooked to the both side connection rings 26.

Preferably, the elastic members 30 may be formed on both sides, and may be combined with the both side connection rings 26, respectively.

Figure 8:
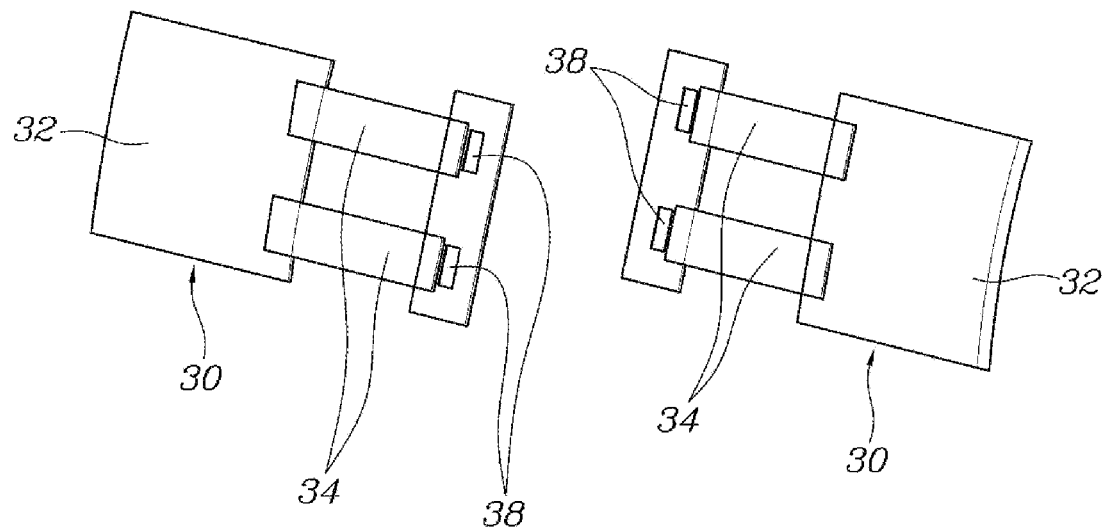
FIG. 8 is a view illustrating the structure of an embodiment of an elastic member individually combined with both sides of a packet member according to the present disclosure.

That is, FIG. 8 is a view illustrating the structure of an embodiment of an elastic member 30 individually combined with both sides of a packet member 20. Two elastic members 30 are symmetrically provided on both sides based on the center of the front of the backboard 10, and the both side elastic members 30 are combined with the both side connection rings 26, respectively.

Meanwhile, referring to FIG. 6, according to the present disclosure, the connection ring 26 may be formed in a shape corresponding to the through-slot 16, and the connection ring 26 may be inserted into the through-slot 16.

That is, in a state where the pocket member 20 is rotated toward the backboard 10 and the pocket space S is reduced, the connection ring 26 completely enters into the through-slot 16, and thus it is minimized that the pocket member 20 and the backboard 10 get apart from each other. Accordingly, an inflow of foreign substances is prevented while the pocket is not in use, and the appearance of the seatback pocket is improved.

In addition, as illustrated in FIG. 8, the elastic member 30 includes a fabric part 32 formed in a surface shape having a predetermined area, and having one end combined with the pocket member 20, and an elastic band 34 formed of a material having elasticity and having one end combined with the other end of the fabric part 32 and the other end combined with the backboard 10.

For example, the fabric part 32 is penetratingly combined with the connection ring 26, and the elastic band 34 being connected to the fabric part 32 is hook-combined with a hook to be described later.

Further, the fabric part 32 is formed of a cloth material and is formed in a rectangular surface shape to be exposed outside, and the elastic band 34 is formed of an elastic material, such as spandex.

That is, in case that the pocket member 20 is rotated in an open direction of the pocket space S, the elastic band 34 is pulled and lengthened toward the pocket member 20, and the fabric part 32 blocks both side parts of the pocket space S to protect goods accommodated inside the pocket space S.

Further, in case that the pocket member 20 is rotated in a close direction of the pocket space S, it is rotated by an elastic restoring force of the elastic band 34.

That is, since the elastic band is shortened by the elastic restoring force of the elastic band 34, the fabric part 32 is returned to its previous position, and thus the pocket member 20 is rotated in the close direction of the pocket space S.

However, the elastic member 30 may be solely formed with one part, and may be hook-combined together with both side connection rings 26.

Figure 9:
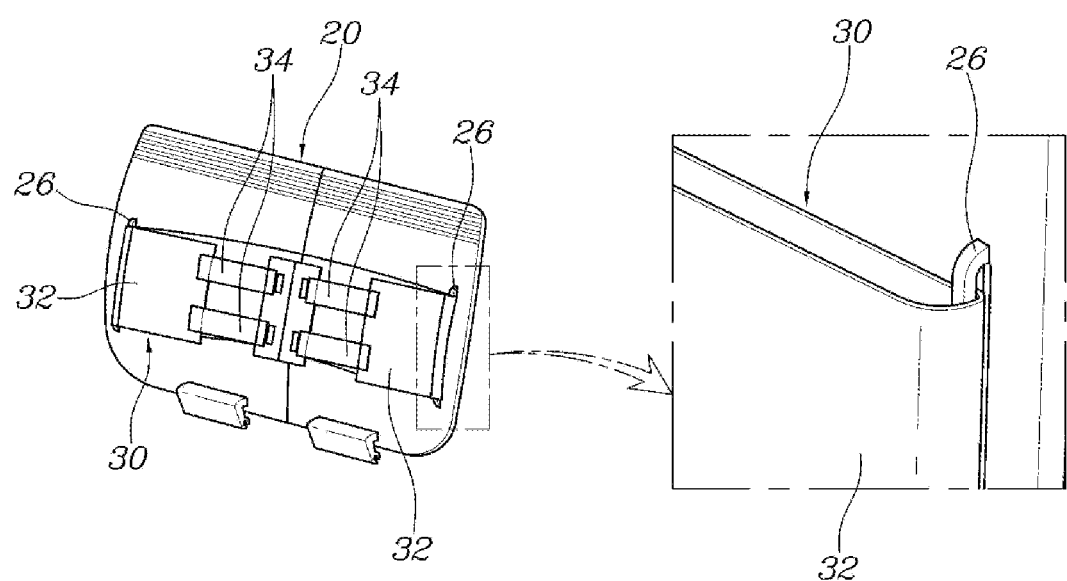
FIG. 9 is a view illustrating the structure of another embodiment of an elastic member being hooked together to both sides of a pocket member according to the present disclosure.

For example, FIG. 9 is a view illustrating the structure of another embodiment of an elastic member 30 being hooked together with connection rings 26 on both sides of a pocket member 20. The elastic member includes a fabric part 32 formed in a surface shape having a predetermined area and having a middle portion being penetratingly hooked on both sides of the pocket member 20, and an elastic band 34 combined with both ends of the fabric part 32, formed of a material having elasticity, and having one end combined with one end of the fabric part 32 and the other end combined with the backboard 10.

That is, one elastic band 34 is penetratingly hooked on the connection rings 26 on both sides of the pocket member 20.

Of course, in this structure, the elastic band 34 is combined with the front of the backboard 10.

In addition, according to the present disclosure, a hooking hole 38 is formed at the other end of the elastic band 34, and a hook 18 is formed on the middle portion of the rear side of the backboard 10 to form a structure in which the hooking hole 38 is hook-combined with the hook 18.

For example, the hooking hole 30 is formed in a rectangular hole shape, and the hook 18 is formed to be bent in an L-shape.

Accordingly, since the hooking hole 30 can be easily engaged with or disengaged from the hook 18, the elastic band 34 can be easily assembled, and the replacement work thereof can also be easily performed.

As described above, according to the present disclosure, since the seatback pocket is implemented only by three parts of the backboard 10, the pocket member 20, and the elastic member 30, the number of parts being used to manufacture the pocket can be drastically reduced, and thus the cost and the weight of the seatback pocket can be decreased in accordance with the reduction of the number of parts.

In addition, since the exterior of the seatback pocket is finished through the injection molding of the backboard 10 and the pocket member 20, the quality level of the seatback pocket product can be improved with the price competitiveness thereof maintained.

Although specific embodiments of the present disclosure have been illustrated and described for illustrative purposes, those of ordinary skill in the art will appreciate that various modifications, additions and substitutions are possible, without departing from the scope and spirit of the present disclosure as disclosed in the accompanying claims.

The invention claimed is:

1. A seatback pocket comprising:
    a backboard secured to a rear side of a seatback, the backboard including a hinge shaft positioned at a lower end, the hinge shaft extending in a horizontal direction;
    a pocket member having a hinge part formed at a lower end, the pocket member being secured to the hinge shaft through a hinge structure to be rotated based on the hinge shaft, the pocket member being formed in a shape covering an outside of the backboard to provide a pocket space in a region facing the backboard; and
    an elastic member connected to both ends of the pocket member and the backboard in a shape blocking sides of the pocket space, and being configured to provide an elastic restoring force with respect to a rotation direction of the pocket member of which the pocket space is expanded;
    wherein one end of the elastic member is connected to a side part of the pocket member;
    a through-slot is formed on a side part of the backboard and the elastic member penetrates the through-slot; and
    an other end of the elastic member is secured to a front side of the backboard.

2. The seatback pocket according to claim 1, wherein a hinge insertion hole is positioned at a lower end of the backboard;
    the hinge shaft is separately provided in front of the hinge insertion hole;
    one end of the hinge part is fixed to a rear side of a lower end of the pocket member, and is inserted into the hinge insertion hole; and
    a hinge fitting groove corresponding to a cross-sectional shape of the hinge shaft is formed at the other end of the hinge part in a horizontal direction, and the hinge shaft is fitted into the hinge fitting groove.

3. The seatback pocket according to claim 2, wherein the hinge part comprises an L-shaped cross section, and the hinge fitting groove faces a downward direction; and
    a fitting slot having a length shorter than an inner diameter of the hinge fitting groove is in a radial direction of the hinge fitting groove being directed to the hinge shaft, and the hinge shaft is fitted into the fitting slot.

4. The seatback pocket according to claim 1, wherein a connection ring is formed on a side part of a front side of the pocket member and the elastic member is hook-combined with the connection ring.

5. The seatback pocket according to claim 1, wherein connection rings are formed on both side parts of a rear side of the pocket member and the elastic member is penetratingly hooked to both side connection rings.

6. The seatback pocket according to claim 4, wherein the connection ring is formed in a shape corresponding to the through-slot, and the connection ring is inserted into the through-slot.

7. The seatback pocket according to claim 1, wherein the elastic member comprises:
    a fabric part formed in a surface shape having a predetermined area, and having one end secured to the pocket member; and
    an elastic band formed of a material having elasticity, and having one end secured to an other end of the fabric part, and an other end secured to the backboard.

8. The seatback pocket according to claim 7, wherein a hooking hole is formed at the other end of the elastic band; and
    a hook is formed on a middle portion of a rear side of the backboard, and the hooking hole is hook-combined with the hook.

9. The seatback pocket according to claim 1, wherein the elastic member comprises:
    a fabric part formed in a surface shape having a predetermined area and having a middle portion being penetratingly hooked on both sides of the pocket member; and
    an elastic band secured to both ends of the fabric part, formed of a material having elasticity, and having one end secured to one end of the fabric part and an other end secured to the backboard.

* * * * *